(12) United States Patent
Iinuma

(10) Patent No.: US 6,708,594 B1
(45) Date of Patent: Mar. 23, 2004

(54) CIRCULAR SAW

(75) Inventor: Tomoyuki Iinuma, Aichi (JP)

(73) Assignee: Kanefusa Kabushiki Kaisha, Niwa-gun (JP)

( * ) Notice: Subject to any disclaimer, the term of this patent is extended or adjusted under 35 U.S.C. 154(b) by 0 days.

(21) Appl. No.: 09/889,568

(22) PCT Filed: Jan. 24, 2000

(86) PCT No.: PCT/JP00/00332

§ 371 (c)(1),
(2), (4) Date: Jul. 30, 2001

(87) PCT Pub. No.: WO00/44539

PCT Pub. Date: Aug. 3, 2000

(30) Foreign Application Priority Data

Jan. 29, 1999 (JP) .............................. 11-21817
Nov. 24, 1999 (JP) ............................. 11-332827

(51) Int. Cl.⁷ .............................. B23D 61/02
(52) U.S. Cl. ........................... 83/835; 83/848
(58) Field of Search ................... 83/835, 851, 846, 83/848; 29/103 R, 105; 143/133; 51/309

(56) References Cited

U.S. PATENT DOCUMENTS

| 3,204,674 A | | 9/1965 | Griffin | |
|---|---|---|---|---|
| 3,576,061 A | * | 4/1971 | Pahlitzsch | 29/105 |
| 3,576,200 A | * | 4/1971 | Elmes | 143/133 |
| 3,878,747 A | * | 4/1975 | Soderstrom | 83/835 |
| 4,011,783 A | * | 3/1977 | Mobley | 83/846 |
| 4,012,820 A | * | 3/1977 | Nowak | 29/103 R |
| 4,034,638 A | * | 7/1977 | Drum | 83/835 |
| 4,114,494 A | * | 9/1978 | Budke | 83/835 |
| 4,135,421 A | * | 1/1979 | Bertram | 83/835 |
| 4,173,914 A | * | 11/1979 | Vollmer et al. | 83/848 |
| 4,331,056 A | | 5/1982 | Hombach et al. | |
| 4,407,178 A | * | 10/1983 | Storzer | 83/835 |
| 4,463,645 A | | 8/1984 | Goellner | |
| 4,525,178 A | * | 6/1985 | Hall | 51/309 |
| 4,604,933 A | * | 8/1986 | Lesher | 83/851 |
| 4,794,835 A | | 1/1989 | Fujiyoshi | |
| 4,848,205 A | * | 7/1989 | Suzuki et al. | 83/853 |
| 4,867,025 A | * | 9/1989 | Eklof | 83/835 |
| 4,867,026 A | * | 9/1989 | Henning et al. | 83/835 |

FOREIGN PATENT DOCUMENTS

| DE | 297 07 665 | | 10/1997 |
|---|---|---|---|
| DE | PCT/EP94/01515 | * | 11/1998 |
| EP | 0 640 422 | | 3/1995 |
| GB | 1 151 382 | | 5/1969 |
| JP | 63-1501 | | 1/1988 |
| JP | 63-134701 | | 9/1988 |
| JP | 3-44516 | | 4/1991 |
| JP | 5-67425 | | 9/1993 |
| JP | 8-1772 | | 1/1996 |
| JP | 8-39504 | | 2/1996 |
| JP | 8-300219 | | 11/1996 |
| JP | 10-80823 | | 3/1998 |
| JP | 10-180539 | | 7/1998 |
| JP | 10-180540 | | 7/1998 |
| LU | 37 228 | | 5/1959 |

* cited by examiner

Primary Examiner—Mark S. Graham
Assistant Examiner—Tom Duong
(74) Attorney, Agent, or Firm—Oblon, Spivak, McClelland, Maier & Neustadt, P.C.

(57) ABSTRACT

A side cutting edge of a tip 20 fixed to the outer circumference of a circular saw blade body 11 has a inflexion point K at a portion at which the tip projects laterally to the greatest distance. An outer-circumferential-side portion of the side cutting edge has a negative radial clearance angle of not less than −1° but less than 0° at the inflexion point, and an inner-circumferential-side portion of the side cutting edge has a positive radial clearance angle of greater than 0° but less than −1° at the inflexion point. By virtue of this configuration, a cut surface having a better surface roughness as compared to that obtained conventionally can be obtained in cutting of a soft material such as wood by use of a circular saw.

3 Claims, 16 Drawing Sheets

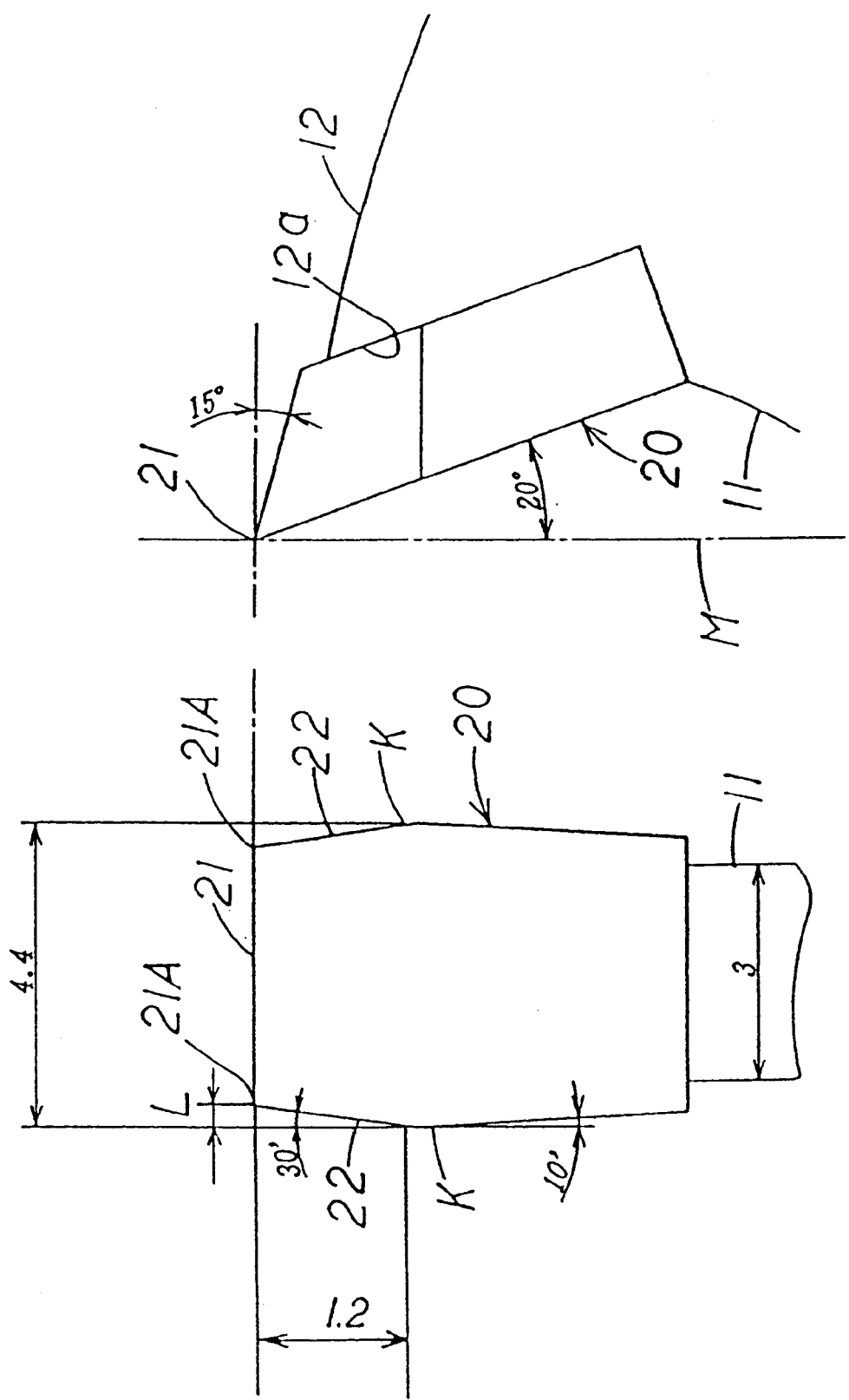

(a) TIPPED SAW OF THE PRESENT INVENTION (b) CONVENTIONAL TIPPED SAW (a) TIPPED SAW OF THE PRESENT INVENTION (b) CONVENTIONAL TIPPED SAW

TIPPED SAW OF THE PRESENT INVENTION

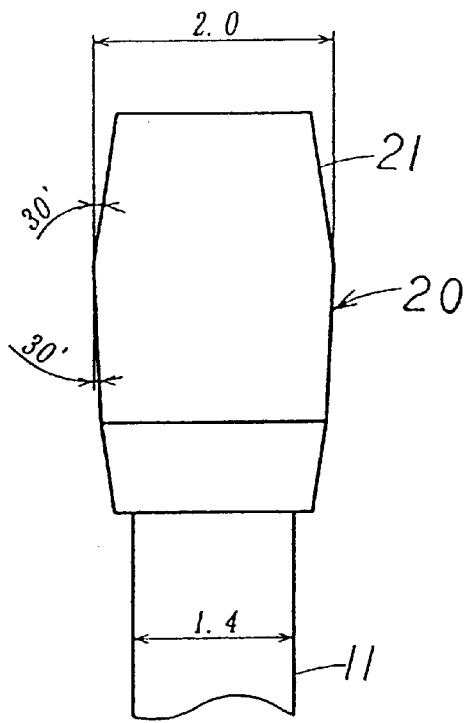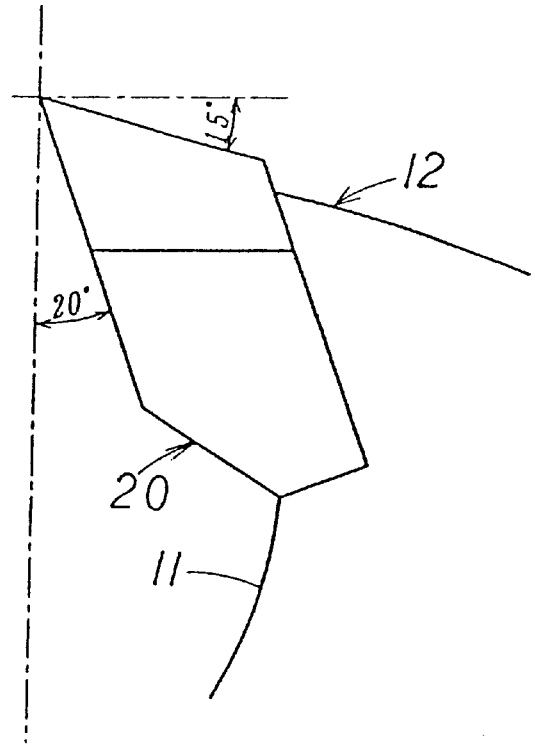
Fig. 13A  Fig. 13B
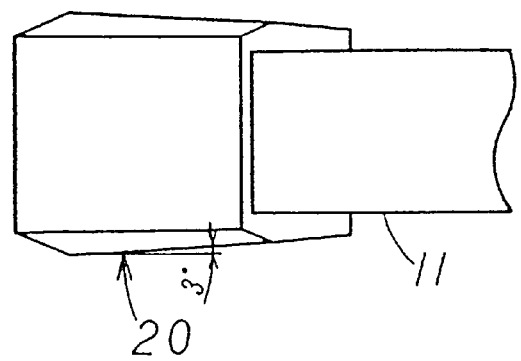
Fig. 13C

CIRCULAR SAW

TECHNICAL FIELD

The present invention relates to a circular saw used for woodworking and similar work, and more particularly, to the shape of side cutting edges of tips fixed to teeth of the circular saw.

BACKGROUND ART

In a conventional circular saw of the above-described type, side cutting edges of tips are formed to assume a positive radial clearance angle with respect to a radial direction. The surface roughness of a cut surface of a workpiece formed as a result of cutting the workpiece by use of a circular saw will be considered with reference to FIG. 18. In an example case in which a workpiece is cut by use of a circular saw having 40 flat tips (top bevel angle is zero, face bevel angle is zero)each having a radial clearance angle of 1°, at a rotational speed of 4000 rpm and a material feed rate of 5 m/min, the feed amount per tip becomes about 0.03 mm, and a theoretical surface roughness Rmax calculated on the basis of the feed amount becomes about 0.55 $\mu$m.

However, when a wood workpiece (pinus radiata wood) was actually cut by use of the above-described circular saw, the surface roughness Rmax of the cut surface was 86.4 $\mu$m, which greatly deviates from the theoretical value. The conceivable reason is as follows. Since wood is a fiber-containing material, wood is generally cut through a cutting mechanism to be described below, with easiness of cutting varying slightly with the direction along which fibers are cut. That is, when shear load is produced due to cutting force acting on a rake face, cracks are first generated in the material under cutting such that the cracks extend from the peripheral cutting edge toward the direction of rotation of the saw and outward with respect to the width direction of the saw, and subsequently, chips are produced while being torn from the generated cracks. Since the above-described operation is repeated in order to effect cutting, cracks and depressions remain on the cut material. As a result, the surface roughness greatly deviates from the theoretical value.

The present invention solves the above-described problems, and its object is to provide a circular saw which can reduce the surface roughness of a cut surface of a soft material such as wood formed though cutting.

DISCLOSURE OF THE INVENTION

In order to achieve the above-described object, the first invention provides a circular saw having tips fixed to a plurality of teeth projecting radially outward from the outer circumference of a disk-shaped saw blade body, characterized in that a side cutting edge, which has a inflexion point at a portion at which the side cutting edge projects laterally to the greatest width in a front view of the tip, has a negative radial clearance angle of not less than −1° but less than 0° in the vicinity of the inflexion point of the side cutting edge and on the outer circumferential side with respect to the inflexion point, and a positive radial clearance angle of greater than 0° but less than 1° in the vicinity of the inflexion point of the side cutting edge and on the inner circumferential side with respect to the inflexion point.

In the tipped saw according to the first invention having the above-described structure, since the side cutting edge is formed to assume a negative radial clearance angle on the outer circumferential side with respect to the inflexion point and a positive radial clearance angle on the inner circumferential side with respect to the inflexion point, there can be obtained a cut surface of lower surface roughness (greater smoothness) as compared with that obtained by use of a conventional saw. Notably, the radial clearance angle of 0° is not preferable, because the cut surface is likely to be burned. Further, when the outer-circumferential-side radial clearance angle is less than −1° or when the inner-circumferential-side radial clearance angle is greater than 1°, surface roughness increases.

The second invention provides a circular saw having tips fixed to a plurality of teeth projecting radially outward from the outer circumference of a disk-shaped saw blade body, characterized in that the plurality of tips include in combination the tips according to the first invention and second tips, wherein the second tips have an outer circumferential height greater than that of the tips according to the first invention and a maximum width narrower than that of the tips according to the first invention.

In the tipped saw according to the second invention having the above-described structure, the tips according to the first invention and the second tips are combined so as to perform divided cutting such that peripheral cutting is performed mainly by the second tips, and a rough cut surface formed as a result of cutting by the second tips is subjected to surface cutting performed by the tips of the first invention. As a result, it becomes possible to obtain cut surface of good quality, while reducing cutting resistance as compared with the case of use of a circular saw having the tips of the first invention only.

The third invention is characterized in that a mechanism having a higher damping capability is equipped to the saw blade body of the above-described circular saw such that at least a portion of the mechanism is present in an area between a concentric circle having a diameter 80% the outer diameter of the circular saw and a concentric circle having a diameter 100% the outer diameter of the circular saw.

This configuration prevents vibration of the saw blade body of the circular saw. As a result, peculiar cutting noise generated during cutting upon use of the tips can be suppressed, and cut surface of high quality can be obtained.

BRIEF DESCRIPTION OF THE DRAWINGS

FIG. 1 shows enlarged front and side views of a tip of a circular saw according to a first embodiment of the present invention.

FIG. 13 shows enlarged front, side, and plan views of a tip of a circular saw of Test Example 6.

BEST MODE FOR CARRYING OUT THE INVENTION

Figure 2A:
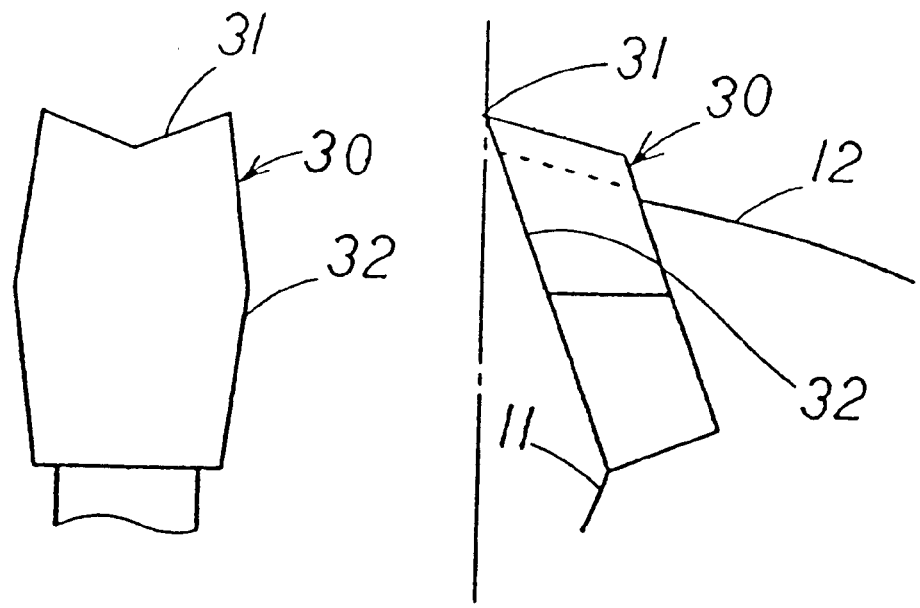
FIG. 2 shows enlarged front and side views of tips of circular saws according to modifications of the first embodiment.

Embodiments of the present invention will be described with reference to the drawings. FIGS. 1(*a*) and 1(*b*) show a tip, which is a main portion of a tipped circular saw according to a first embodiment, by means of a front view (view obtained through projecting the tip on a plane M including the rotational axis of the circular saw and the tip of the tip) and a side view.

A tip 20 is provided on a front face 12*a*, with respect to the rotational direction, of each tooth 12 projecting outward from the outer circumference of a disk-shaped saw blade body 11 of a circular saw (in FIG. 1, the circular saw has an outer diameter of 255 mm, a saw blade body thickness of 3 mm, and 40 teeth). The tip 20 inclines slightly toward the front side with respect to the rotational direction to thereby form a rake angle (20° in the illustrated example). A peripheral cutting edge 21 is flat and has a peripheral clearance angle (15° in the illustrated example). As shown in FIG. 1, each side cutting edge 22 of the tip 20 has a inflexion point K at a position which is offset from the outer circumference toward the inner circumference side by a predetermined distance (1.2 mm in the illustrated example). At the inflexion point K, the tip 20 projects laterally to have the greatest width (4.4 mm in the illustrated example). The side cutting edge 22 forms straight lines that extend from the inflexion point K toward opposite sides each other. The radial clearance angle on the outer circumferential side of heinflexion point K is negative (-30' in the illustrated example), and the radial clearance angle on the inner circumferential side of the inflexion point K is positive (10' in the illustrated example).

In the tip 20, a between an outer circumference end portion 21A and the inflexion point K as measured along the width direction is about 0.01 mm (about 10 $\mu$m). Therefore, cracks and depressions generated by the outer circumference end portion 21A are cut over a length L of their entire heights. The theoretical surface roughness Rmax of a cut surface of a wood workpiece cut by use of a circular saw having the tip 20 is 76.4 $\mu$m, which is a value obtained through subtraction of the length L from the surface roughness Rmax of 86.4 $\mu$m above-mentioned for the case in which a wood workpiece was actually cut by use of a conventional circular saw. However, when a wood workpiece (pinus-radiata wood) was actually cut by use of the above-described circular saw at a rotational speed of 4000 rpm and a material feed rate of 5 m/min, the surface roughness Rmax was measured to be 18.6 $\mu$m, which greatly deviates from the calculated value of 76.4 $\mu$m. That is, cracks and depressions generated upon cutting by use of the circular saw of the present embodiment were found to be smaller than cracks and depressions generated upon cutting by use of a conventional circular saw whose side cutting edge has a positive radial clearance angle only. Therefore, when a workpiece is cut by use of the outer-circumference end portion 21A, which is a portion of the side cutting edge 22 having a negative radial clearance angle, the sizes of generated cracks and depressions can be decreased. In addition, since generated cracks and depressions are cut-removed by an amount corresponding to the widthwise length L, cracks and depressions remaining on a finished surface further decrease in size. Moreover, in the vicinity of the inflexion point K, the workpiece is cut in such a manner that the cut surface is cut lightly and shallowly or is pressed inward. Therefore, conceivably, new cracks are hardly generated on the finished surface.

Next, modifications of the above-described embodiment will be described.

Figure 2B:
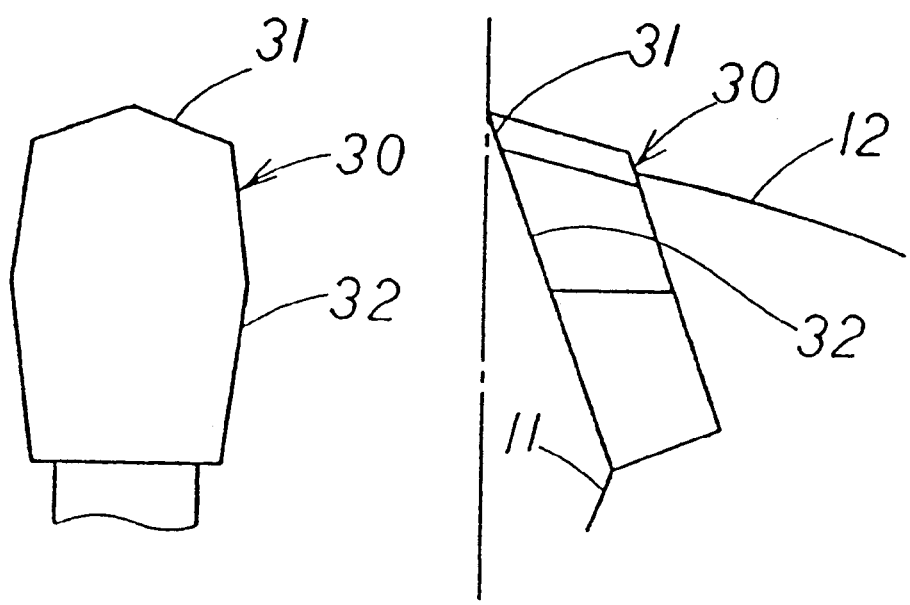
Figure 3:
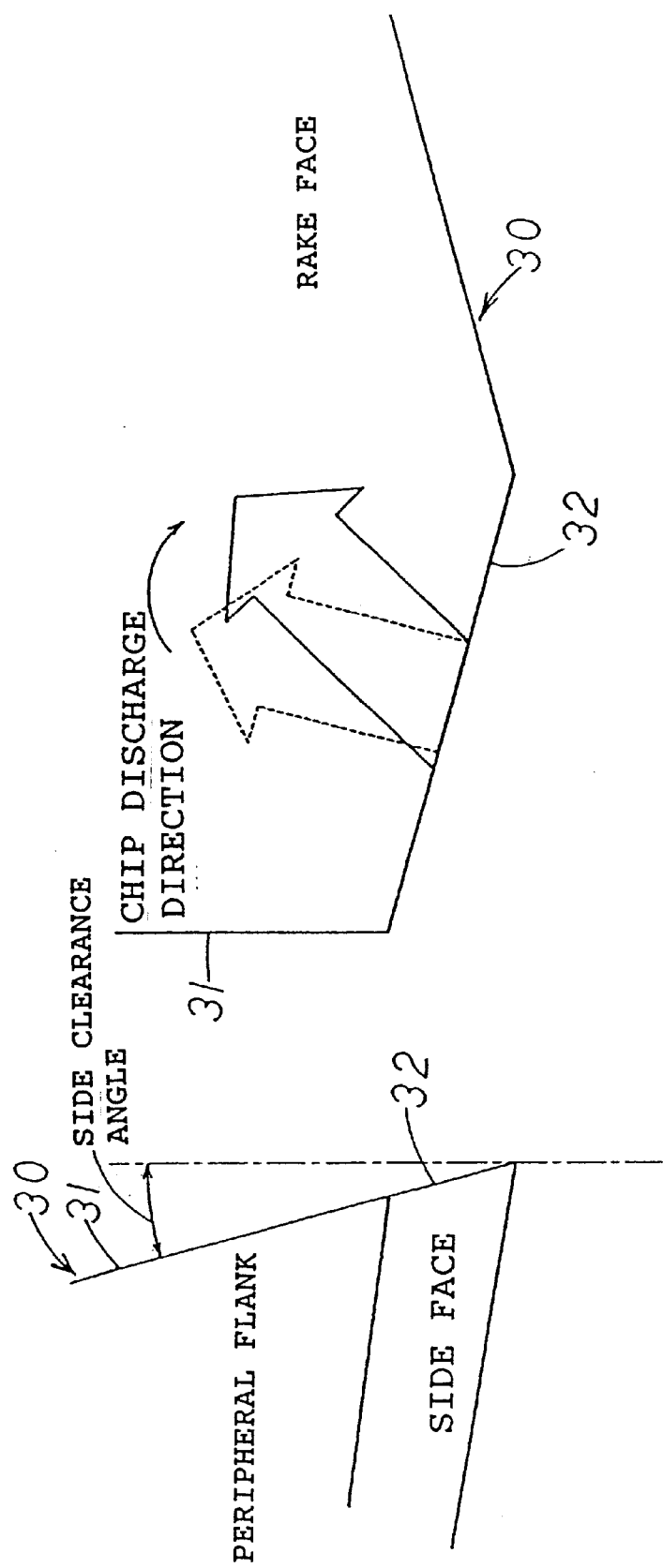
FIG. 3 is an explanatory diagram showing a cutting state in the case in which a rake face of a tip has a face bevel angle.

In one modification, as shown in FIG. 2, a peripheral cutting edge 31 of a tip 30 whose side cutting edges have positive and negative radial clearance angles is formed into a concave shape (FIG. 2(*a*)) or a convex shape (FIG. 2(*b*), which shape is symmetric with respect to the widthwise direction. For the case of the peripheral cutting edge 31 being formed into a concave shape, the peripheral cutting edge 31 of the concave shape was found to further reduce the generation of cracks and depressions that extend outward in the thickness direction of the saw. Further, since the peripheral cutting edge 31 of the concave shape improves the stability of the tip 30 in terms of moving straight with respect to the material feed direction to thereby suppress side run-out, the rake surface can be finished much better. Moreover, as shown in FIG. 3, when the rake face of the tip 30 is formed to have a face bevel angle, side cutting resistance can be reduced, so that the flow direction of chips can be changed to a direction indicated by an arrow (solid line) in order to facilitate discharge of chips.

Next, tips which fall within the scope of the present invention but differ from the above-described embodiments will be described. Each of the tips shown in the above-described embodiments has a single rake face. Here, tips T1 to T3 each of which has two flat rake faces 41 on either side of the inflexion point K, will be described.

Figure 4:
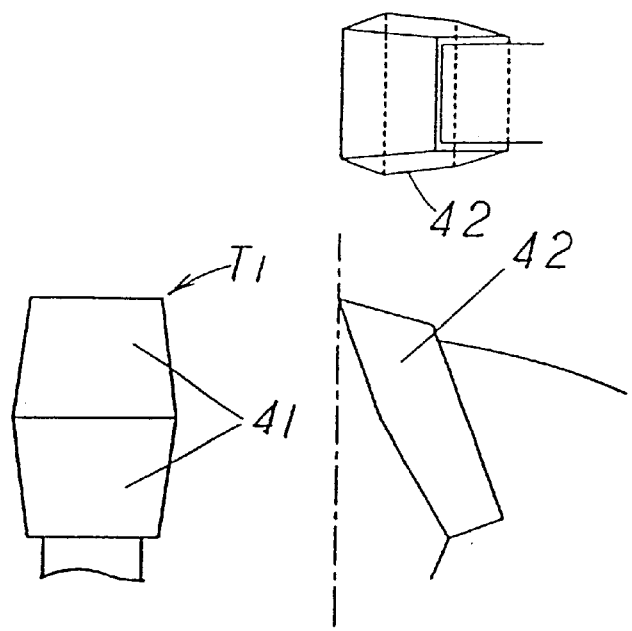
FIG. 4 shows enlarged front, plan, and side views of a tip of a circular saw which has a inflexion rake face having no face bevel angle.
Figure 5:
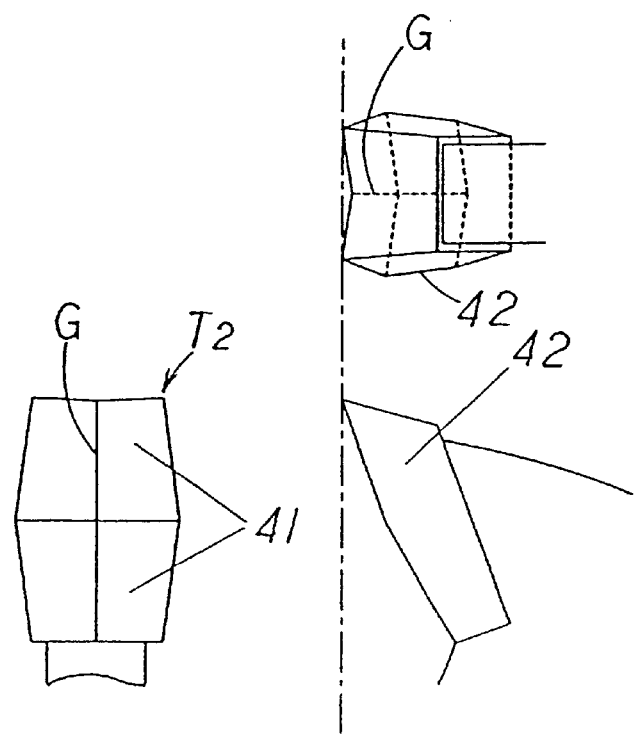
FIG. 5 shows enlarged front, plan, and side views of a tip which has a inflexion rake face having a face bevel angle that is constant irrespective of position in the radial direction of the saw.
Figure 6:
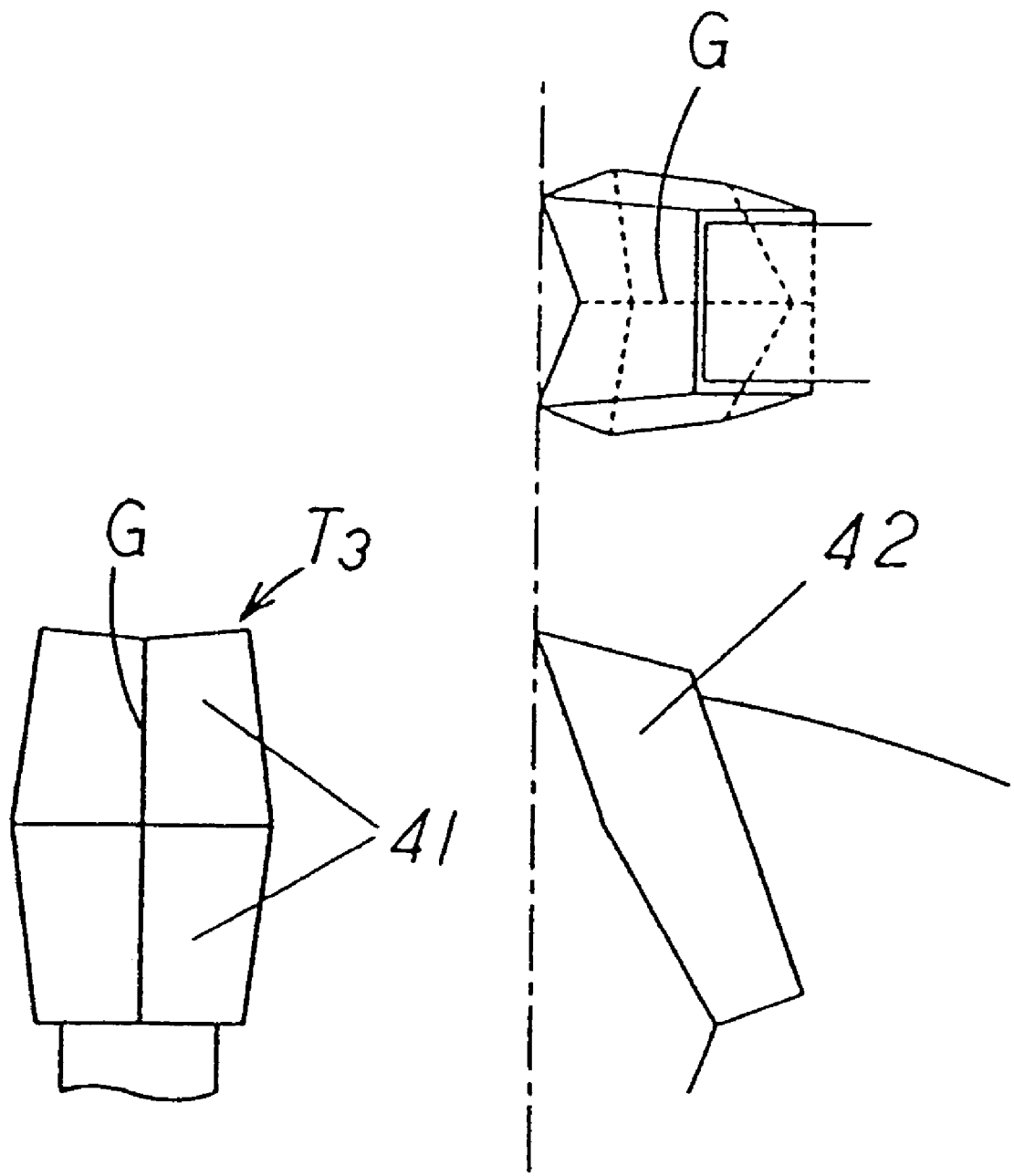
FIG. 6 shows enlarged front, plan, and side views of a tip which has a inflexion rake face having a face bevel angle that changes with the radial direction of the saw.

FIG. 4 shows a tip T1 which has zero face angle; FIG. 5 shows a tip T2 which has a faevel an that is constant along the radial direction of the saw; and FIG. 6 shows a tip T3 which has a face bevel angle that varies along the radial direction of the saw. Notably, as a result of formation of a V groove (arcuate groove) along a line G, the rake face has a face bevel angle. These tips T1 to T3 provide effects similar to those described in relation to the above-described embodiment.

Next, a second embodiment will be described.

The present embodiment is directed to a circular saw in which the tip 20 (or the tip 30) of the above-described embodiment and a conventional tip are attached in combination to the teeth 12 of the saw blade body 11, the conventional tip having a rake angle and a peripheral clearance angle, and an outer-circumferential height greater than that of the tip 20, as well as a maximum width narrower than that of the tip 20. The tips of the above embodiment and the conventional tips may be equal in number or may differ in number. Further, the tips of the above embodiment and the conventional tips may be arranged in accordance with a certain sequence or arbitrarily.

When the tipped saw having the above described configuration is used, peripheral cutting is effected mainly by the conventional tip, and a rough cut surface formed as a result of the cutting by the conventional tip is cut mainly by the tip 20. Since the conventional tip and the tip 20 cut the cutting area in a divided manner, cutting resistance can be reduced, and a well-finished cut surface can be obtained through action of the tip 20.

Next, there will be described specific cutting test examples in which the above-described tip was used.

(1) TEST EXAMPLE 1

Figure 7A:
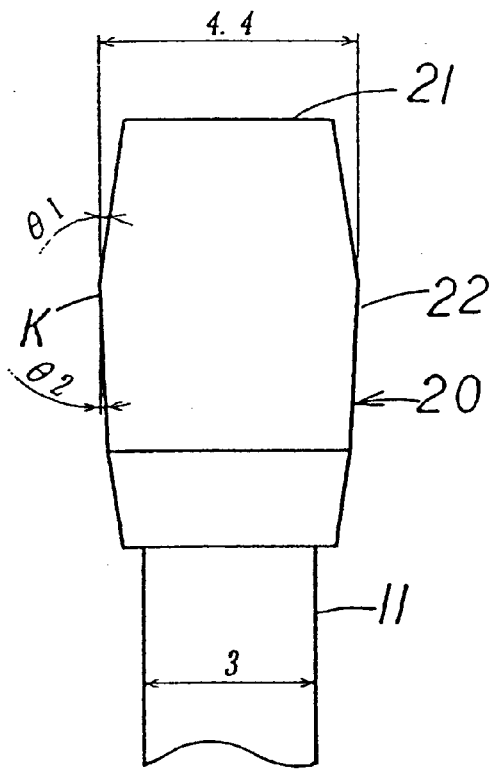
FIG. 7 shows enlarged front, plan, and side views of a tip of a circular saw of Test Example 1.
Figure 7B:
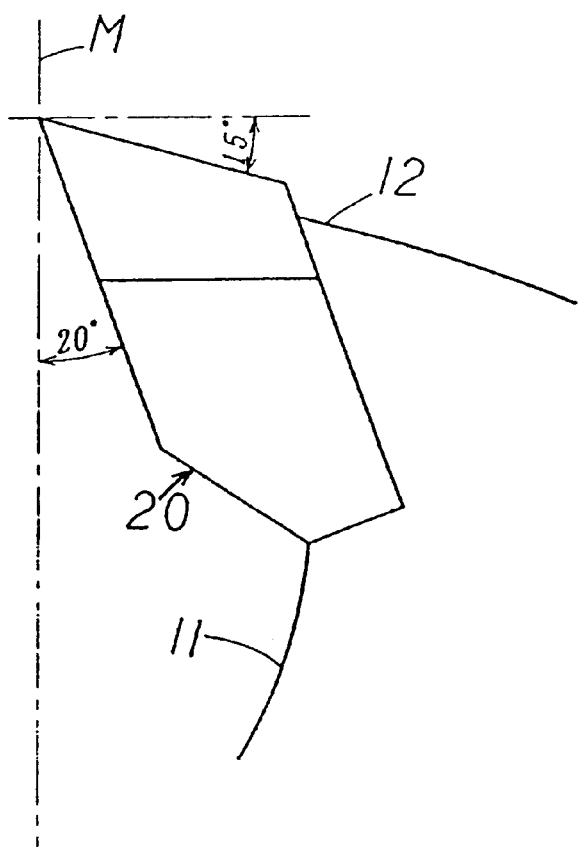
Figure 7C:
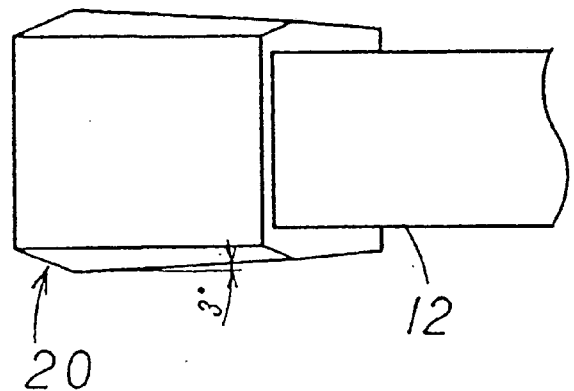

Five types of test samples of tips (tipped saws of the present invention) were prepared. As shown in FIG. 7, each tip had a rake angle of 20°, a side clearance angle of 3°, and a peripheral clearance angle of 15°. An outer-circumferential-side negative radial clearance angle $\theta_1$ and an inner-circumferential-side positive radial clearance angle $\theta_2$ shown in the front view were varied among the five types as shown in Table 1, which will be described below. Further, a conventional tipped saw (having a positive radial clearance angle $\theta_2 = 60'$ only) was prepared as a comparative sample. In each tipped saw, 40 tips were fixed to teeth 12 of a saw blade body 11 having an outer diameter of 255 mm, a saw kerf width of 4.4 mm, and a saw blade body thickness of 3 mm.

Cutting was performed at a rotational speed (of the tipped saw) of 5000 rpm and a material feed rate of 10 m/min. The material of a workpiece was wood (spruce: conifer), and longitudinal cutting (cutting along the direction of fibers) was performed. Evaluation items were center-line average roughness Ra, ten-points average roughness Rz, maximum height Rmax, appearance, and texture of cut surface. Quality of cut surface was judged through total evaluation of these items. Appearance and texture were evaluated, while the cut surface obtained through use of the conventional tipped saw was used as a standard (rank: C). When a cut surface obtained through use of the tipped saw of the present invention was slightly better than the cut surface obtained through use of the conventional tipped saw, the cut surface was assigned rank B. When a cut surface obtained through use of the tipped saw of the present invention was considerably better than the cut surface obtained through use of the conventional tipped saw, the cut surface was assigned rank A. Table 1 shows test results.

TABLE 1

| | outer radial clearance angle $\theta_1$ | inner radial clearance angle $\theta_2$ | total evaluation rank (A. B. C) | appearance rank (A. B. C) | texture (rank A. B. C) | center-line average roughness Ra ($\mu$m) | ten-points average roughness Rz ($\mu$m) | maximum height Rmax ($\mu$m) |
|---|---|---|---|---|---|---|---|---|
| conventional tipped saw | | 60' | C | C | C | 3.5 | 30.4 | 36.7 |
| tipped saws of the present invention | −10' | 30' | A | A | A | 1.8 | 19.0 | 21.3 |
| | −30' | 10' | A | A | A | 1.5 | 15.7 | 18.1 |
| | | 30' | A | A | A | 1.7 | 20.4 | 25.5 |
| | | 50' | A | A | A | 1.8 | 21.5 | 32.3 |
| | | 60' | B | B | B | 2.2 | 23.1 | 31.4 |
| | −60' | 30' | A | A | A | 1.8 | 20.3 | 25.1 |

As is apparent from the results shown in Table 1, as to respective roughness values, appearance, and texture, the five tipped saws of the present invention provided results which are far better than those obtained through use of the conventional tipped saw.

(2) TEST EXAMPLE 2

As test samples of tips (tipped saws of the present invention), there were prepared forty tips each having the same shape as that of the test samples used in Test Example 1. Each tip had a rake angle of 20°, a side clearance angle of 3°, and a peripheral clearance angle of 15°; and an outer-circumferential-side negative radial clearance angle of −10' and an inner-circumferential-side radial clearance angle of 30', both measured in the front view. The forty tips were fixed to a saw blade body having an outer diameter of 255 mm, a saw kerf width of 4.4 mm, and a saw blade body thickness of 3 mm in order to obtain a tipped saw of the present invention. A conventional tipped saw having conventional tips attached thereto was prepared as a comparative sample.

Cutting was performed at a rotational speed (of the tipped saw) of 4000 rpm and a material feed rate of 5, 10, 20, or 30 m/min. The material of a workpiece was wood (pinus radiata: conifer), and transverse cutting (cutting along a direction perpendicular to the fiber direction) was performed. Evaluation items were center-line average roughness Ra, ten-points average roughness Rz, and maximum height Rmax of cut surface. Table 2 shows test results; and FIG. 8 shows the cross-sectional profile of the workpiece cut at a material feed rate of 20 m/min.

TABLE 2

| manterial feed speed (m/min) | center-line average roughness Ra (μm) | ten-points average roughness Rz (μm) | maximum height Rmax (μm) |
|---|---|---|---|
| TIPPED SAW OF THE PRESENT INVENTION | | | |
| 5 | 1.4 | 16.4 | 18.6 |
| 10 | 2.2 | 24.0 | 29.6 |
| 20 | 3.4 | 32.2 | 37.0 |
| 30 | 4.4 | 42.0 | 58.8 |
| CONVENTIONAL TIPPED SAW | | | |
| 5 | 4.6 | 74.4 | 86.4 |
| 10 | 6.4 | 77.2 | 99.4 |
| 20 | 12.8 | 163.2 | 184.8 |
| 30 | 19.4 | 193.8 | 265.2 |

Figure 8A:
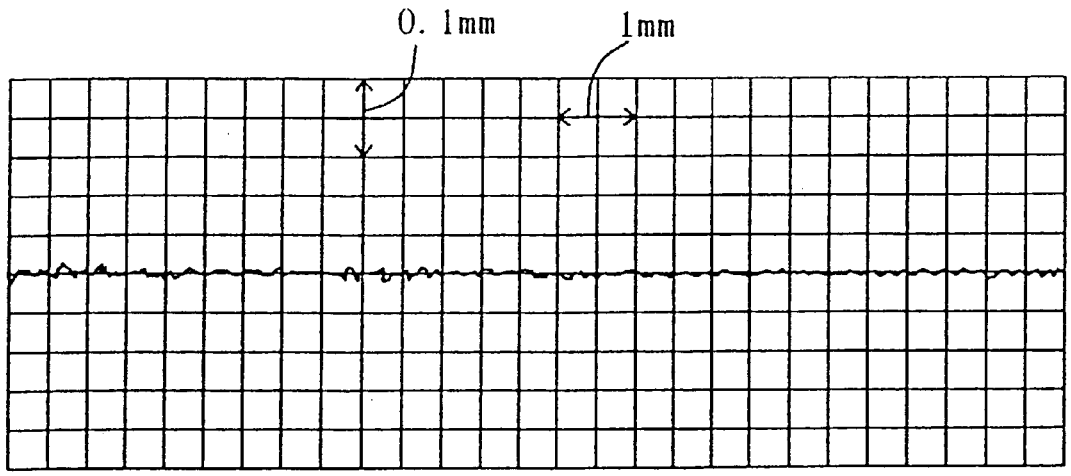
FIG. 8 shows graphs representing the cross-sectional profile of a workpiece cut by use of a tipped saw of the present invention and the cross-sectional profile of a workpiece cut by use of a conventional tipped saw, which profiles were obtained in Test Example 2.
Figure 8B:
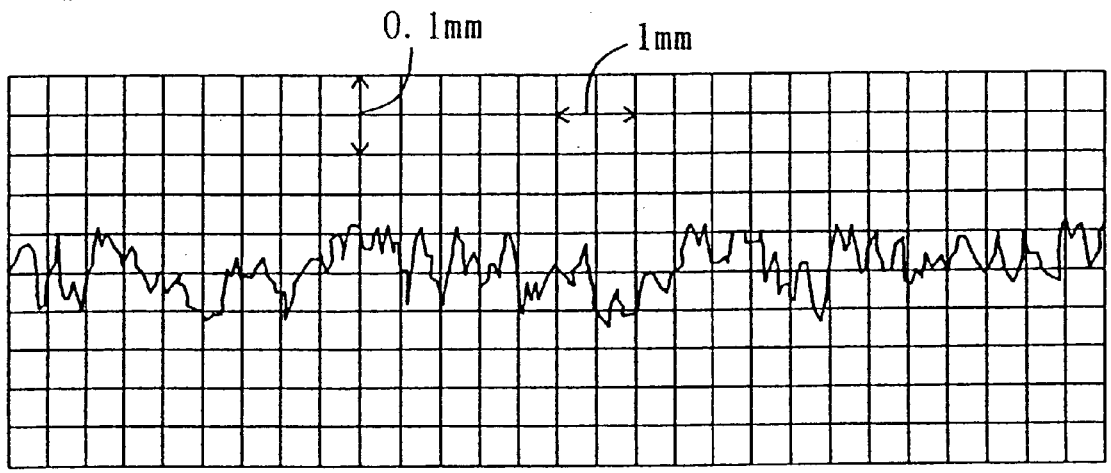

As is apparent from the results shown in Table 2 and the cross-sectional profile shown in FIG. 8, as to respective roughness values, the test sample (the tipped saw of the present invention) achieved greatly smaller values than those obtained by use of the conventional tipped saw. In addition, as to the cross-sectional profile, the test sample achieved a better result, with a clear difference from the result obtained though use of the conventional tipped saw.

(3) TEST EXAMPLE 3

Figure 9A:
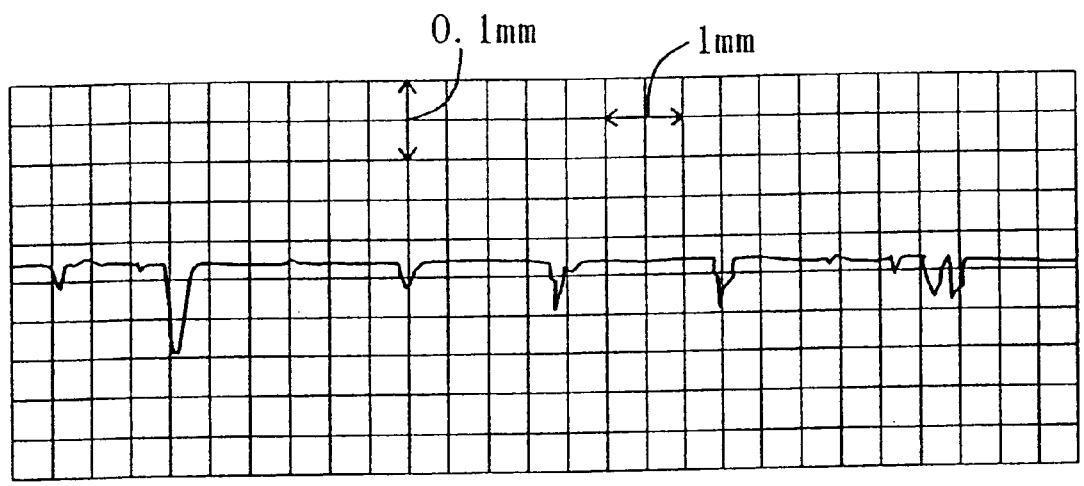
FIG. 9 shows graphs representing the cross-sectional profile of a workpiece cut by use of the tipped saw of the present invention and the cross-sectional profile of a workpiece cut by use of a conventional tipped saw, which profiles were obtained in Test Example 3.
Figure 9B:
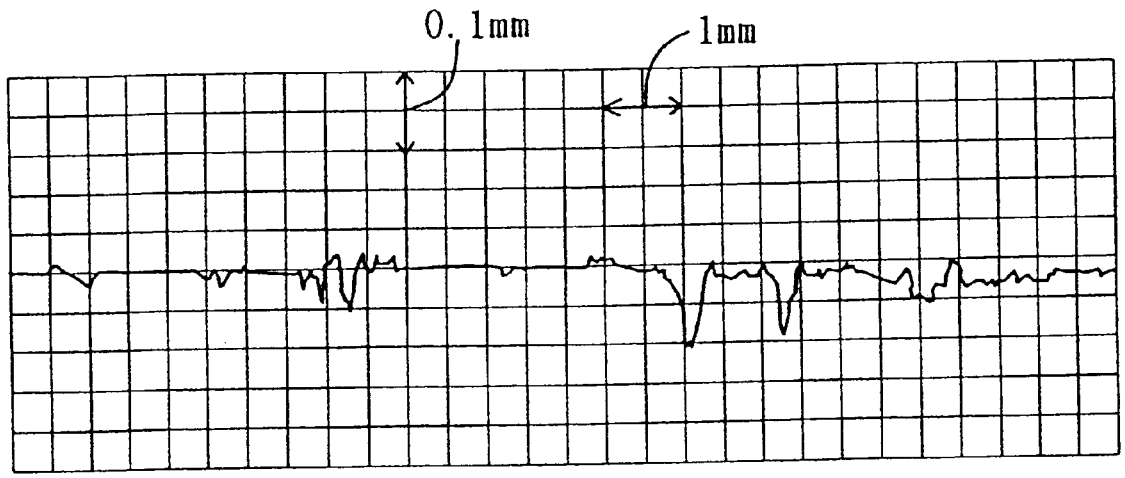

The same test samples of tips as those used in Test Example 2 were used. Cutting was performed at a rotational speed (of the tipped saw) of 4000 rpm and a material feed rate of 5, 10, 20, or 30 m/min. The material of a workpiece was wood (Japanese oak: broad-leafed tree), and transverse cutting was performed. Evaluation items were center-line average roughness Ra, ten-points average roughness Rz, and maximum height Rmax of cut surface. Table 3 shows test results; and FIG. 9 shows the cross-sectional profile of the workpiece cut at a material feed rate of 10 m/min.

TABLE 3

| manterial feed speed (m/min) | center-line average roughness Ra (μm) | ten-points average roughness Rz (μm) | maximum height Rmax (μm) |
|---|---|---|---|
| TIPPED SAW OF THE PRESENT INVENTION | | | |
| 5 | 5.0 | 97.2 | 115.2 |
| 10 | 6.4 | 99.2 | 124.2 |
| 20 | 5.8 | 94.6 | 123.2 |
| 30 | 7.2 | 103.6 | 153.6 |
| CONVENTIONAL TIPPED SAW | | | |
| 5 | 6.8 | 116.8 | 148.4 |
| 10 | 8.2 | 135.2 | 188.2 |
| 20 | 9.8 | 140.8 | 167.6 |
| 30 | 13.2 | 152.0 | 174.8 |

As is apparent from the results shown in Table 3, as to respective roughness values, the test sample (the tipped saw of the present invention) achieved greatly smaller values than those obtained by use of the conventional tipped saw. However since Japanese oak contains vessels of large diameter, the values of surface roughness becomes relatively large, even though the remaining portion is flat, so that the difference from the case of the conventional tipped saw may decrease in some cases. In addition, as to the cross-sectional profile, vessels of large diameter could be identified more clearly as compared with the case of use of the conventional tipped saw, because, in the case of use of the test sample, the cut surface is flat except for vessels of large diameter.

(4) TEST EXAMPLE 4

Figure 10A:
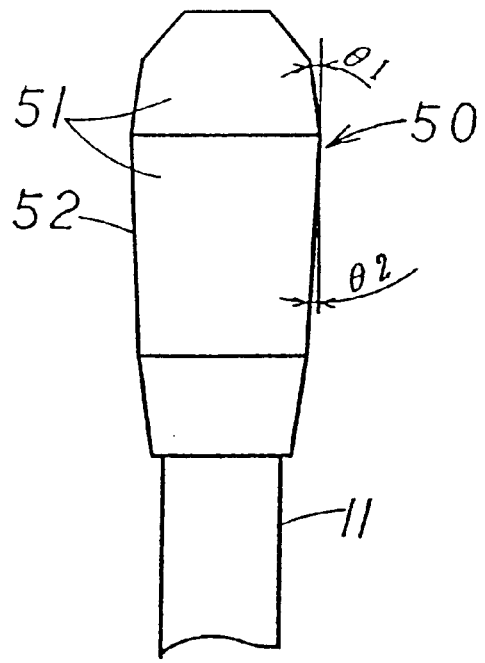
FIG. 10 shows enlarged front and side views of a tip of a circular saw of Test Example 4.
Figure 10B:
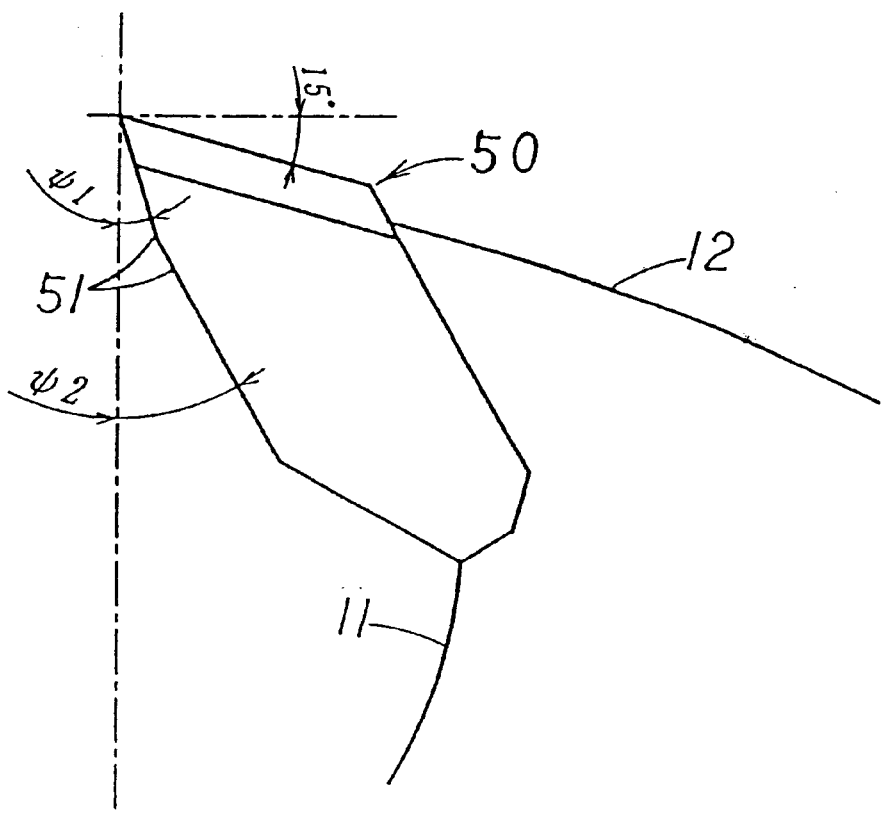

Four types of test samples No. 1 to No. 4 of tips (tipped saws of the present invention) were prepared. As shown in FIG. 10, each sample tip 50 had two cutting surfaces 51 (first rake angle ψ1, second rake angle ψ2). The shape of side cutting edges 52 as viewed in the front view; i.e., the outer-circumferential-side radial clearance angle θ1, the inner-circumferential-side radial clearance angle θ2, the side clearance angle, and the peripheral clearance angle were varied among the test samples No. 1 to No. 4 in accordance with combinations shown in Table 4. Notably, the test samples No. 1 to No. 3 fall outside of the scope of the present invention, because the outer-circumferential-side radial clearance angle θ1 is positive or zero; and therefore, only the test sample No. 4 falls within the scope of the present invention. Further, in the test samples, two rake faces having different rake angles were formed in order to provide a two-step radial clearance angle. In each tipped saw, 40 tips were fixed to teeth 12 of a saw blade body 11 having an outer diameter of 255 mm, a saw kerf width of 4.4 mm, and a saw blade body thickness of 3 mm. A conventional tipped saw was prepared as a comparative sample.

Cutting was performed at a rotational speed (of the tipped saw) of 5000 rpm and a material feed rate of 10 m/min. The material of a workpiece was wood (spruce: conifer), and longitudinal cutting was performed. In addition to appearance and texture, center-line average roughness Ra, and ten-points average roughness Rz, maximum height Rmax of cut surface were evaluated. Appearance and texture were evaluated, while the cut surface obtained through use of the conventional tipped saw was used as a standard (rank: C). When a cut surface obtained through use of the tipped saw of the present invention was slightly better than the cut surface obtained through use of the conventional tipped saw, the cut surface was assigned rank B. When a cut surface obtained through use of the tipped saw of the present invention was considerably better than the cut surface obtained through use of the conventional tipped saw, the cut surface was assigned rank A. Table 5 shows test results.

TABLE 4

| | outer radial clearance angle θ1 | inner radial clearance angle θ2 | rake angle ψ1 | rake angle ψ2 | side clearance angle | peripheral clearance angle |
|---|---|---|---|---|---|---|
| No. 1 | 30' | 60.1' | 20° | 30° | 3.41° | 15° |
| No. 2 | 10' | 34' | 20° | 30° | 2.23° | 15° |
| No. 3 | 0' | 34' | 20° | 30° | 3.27° | 15° |
| No. 4 | −10' | 34' | 17.5° | 30° | 3.45° | 15° |

TABLE 5

| | total evaluation rank (A. B. C) | appearance rank (A. B. C) | texture (rank A. B. C) | center-line average roughness Ra (μm) | ten-points average roughness Rz (μm) | maximum height Rmax (μm) |
|---|---|---|---|---|---|---|
| conventional tipped saw | C | C | C | 3.5 | 30.4 | 36.7 |
| No. 1 | B | B | B | 2.8 | 29.4 | 33.4 |
| No. 2 | B | A | B | 2.2 | 22.9 | 30.1 |
| No. 3 | A | A | A | 1.7 | 19.5 | 22.3 |
| No. 4 | A | A | A | 1.7 | 16.7 | 19.3 |

As is apparent from the results shown in Table 5, the test sample of the present invention (No. 4) and the test sample No. 3 having an outer-circumferential-side radial clearance angle of 0° provided good results for the respective items. Although the test samples No. 1 and 2 having two-step positive radial clearance angles provided better results as compared with the conventional tip, the results provided by the test samples No. 1 and 2 were clearly inferior to those provided by the test samples No. 3 and No. 4. Accordingly, cutting performance is not improved through mere employment of a two-step radial clearance angle, and the radial clearance angle on the outer circumferential side of the tip must be made negative. Although good cutting performance is obtained even in the case of the radial clearance angle on the outer circumferential side of the tip being zero, this makes the cut surface prone to suffering burn.

(5) TEST EXAMPLE 5

A test was performed for the above-described tipped saw of the second embodiment. Although not illustrated, tips for side-face finishing (hereinafter referred to as a finishing tip) had a rake angle of 20°, a side clearance angle of 3°, and a peripheral clearance angle of 15°; and an outer-circumferential-side radial clearance angle of −30' and an inner-circumferential-side radial clearance angle of 10', which defined the shape of side cutting edges as viewed in the front view. Tips for peripheral cutting (hereinafter referred to as rough tips) of a conventional shape had a positive radial clearance angle of 34', a rake angle of 20°, a side clearance angle of 1°, and a peripheral clearance angle of 15°. Twenty finish tips and twenty rough tips were arranged alternately and fixed to a saw blade body 11 having an outer diameter of 255 mm, a saw kerf width of 4.4 mm, and a saw blade body thickness of 3 mm in order to obtain a tipped saw of the present invention. A conventional tipped saw having a saw blade body 11 having the same dimensions and forty flat tips brazed to the saw blade body 11 was prepared as a comparative sample.

Figure 11:
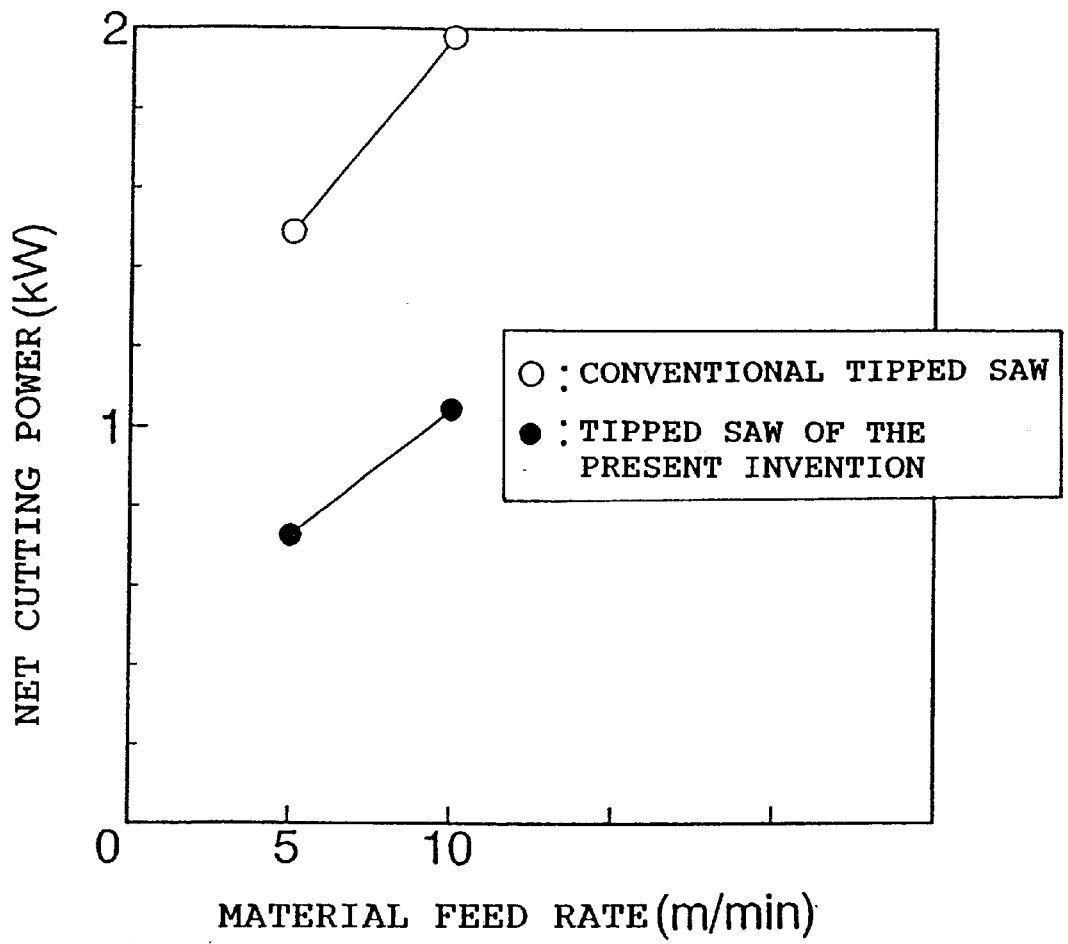
FIG. 11 shows a graph representing the relationship between material feed rate and net cutting power of a tipped saw as obtained in Test Example 5.
Figure 12:
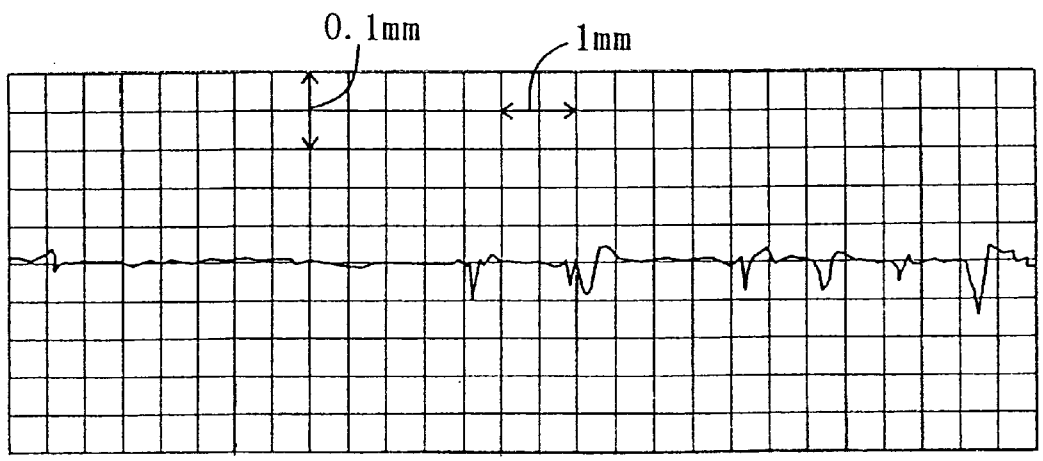
FIG. 12 shows a graph representing the cross-sectional profile of a workpiece cut by use of the tipped saw of the present invention as obtained in Test Example 5.

Cutting was performed at a rotational speed (of the tipped saw) of 4000 rpm and a material feed rate of 5 or 10 m/min. The material of a workpiece was wood (Japanese oak: broad-leaf tree), and transverse cutting was performed. Evaluation items were center-line average roughness Ra, ten-points average roughness Rz, and maximum height Rmax of cut surface. Further, cutting power was measured. Table 6 shows measurement results. FIG. 11 shows the relationship between material feed rate and net cutting power; and FIG. 12 shows the cross-sectional profile of the workpiece cut at a material feed rate of 5 m/min.

TABLE 6

| | manterial feed speed (m/min) | center-line average roughness Ra (μm) | ten-points average roughness Rz (μm) | maximum height Rmax (μm) |
|---|---|---|---|---|
| tipped saw of the present invention | 5 | 4.8 | 98.6 | 123.2 |
| | 10 | 5.6 | 116.0 | 140.8 |
| conventional tipped saw | 5 | 6.8 | 116.8 | 148.4 |
| | 10 | 8.2 | 135.2 | 188.2 |

The results shown in Table 6 demonstrate that the surface roughness of a cut surface obtained through cutting by use of the tipped saw of the present invention is better than that obtained through cutting by use of the conventional tipped saw. Further, in each case; i.e., the material feed rate being set to 5 m/min and the material feed rate being set to 10 m/min, the tipped saw of the present invention reduced the cutting power to about half that for the case of use of the conventional tipped saw. Moreover, the cut surface had a profile equivalent to that of the test sample shown in FIG. 9.

(6) TEST EXAMPLE 6

Figure 15:
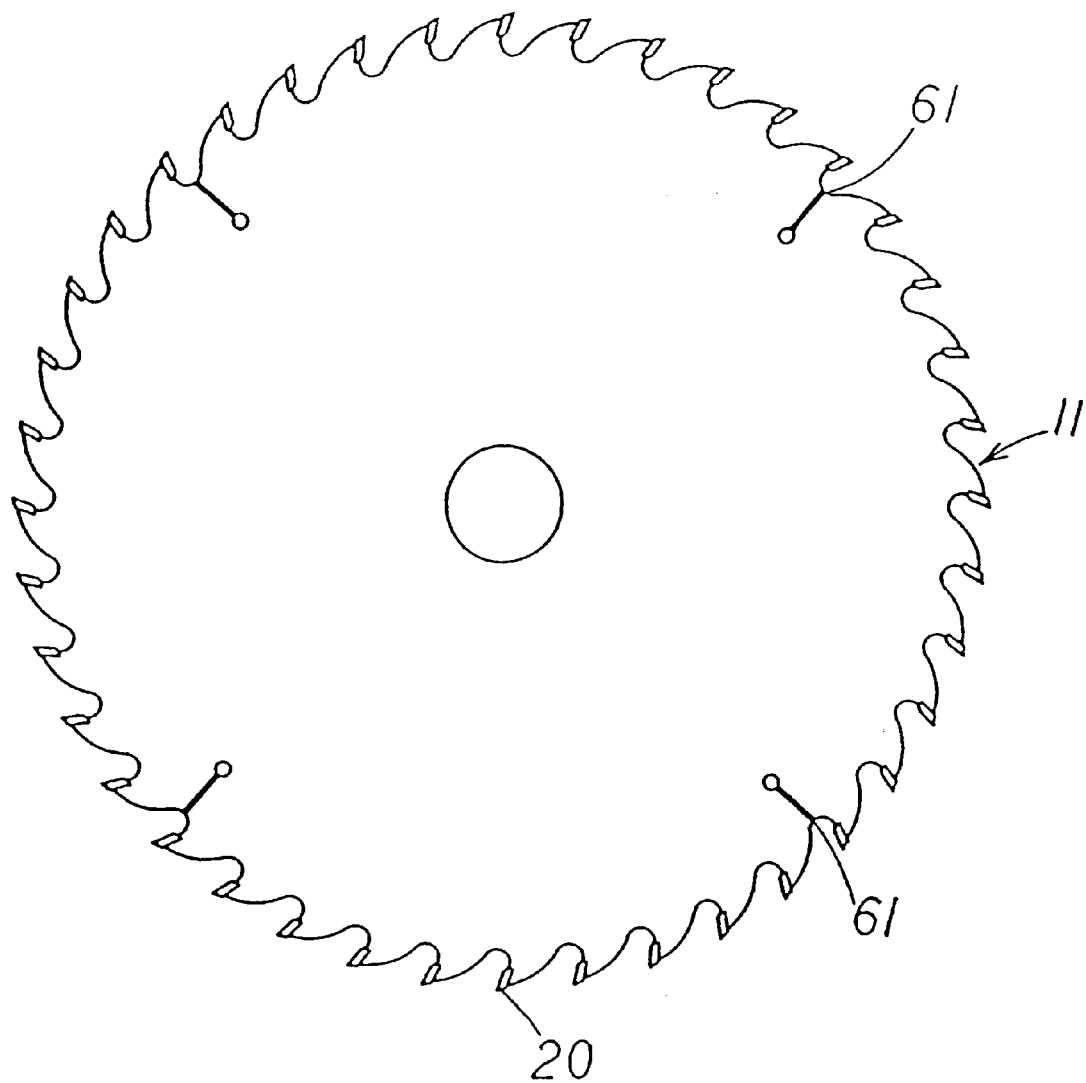
FIG. 15 is a side view showing the entirety of the circular saw of Test Example 6.

Forty tips 20 having a shape as shown in FIG. 13 were prepared; that is, each tip 20 had a side clearance angle of 3°, a peripheral clearance angle of 15°, an outer-circumferential-side radial clearance angle of −30', and an inner-circumferential-side radial clearance angle of 30', as measured in the front view. The forty tips were brazed to a saw blade body 11 having an outer diameter of 255 mm, a saw kerf width of 2.0 mm, and a saw blade body thickness of 1.4 mm. The saw blade body 11 had four slots disposed at a constant pitch (center angle: 90°) and extending to the outer circumference of the saw blade body 11 (see reference numeral 61 shown in FIG. 15; the slots were provided in the tipped saws of Test Examples 1 to 5 as well). Further, an annular vibration-absorbing plate made of steel and having dimensions shown in the following Table 7 was bonded to the saw blade body 11. A tipped saw having the same configuration but not having the vibration-absorbing plate attached was prepared as a comparative sample.

Figure 14:
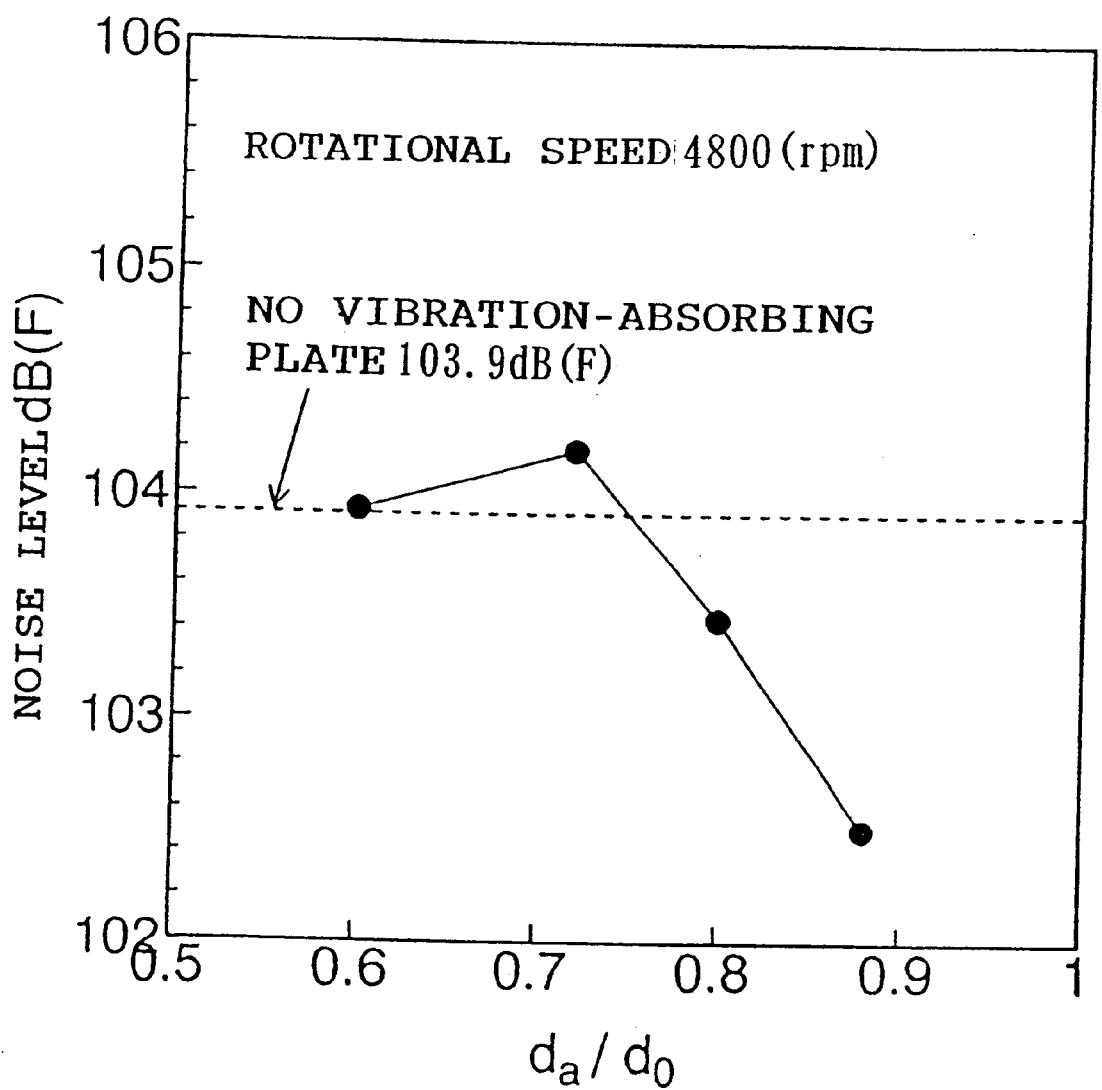
FIG. 14 shows a graph representing the relationship between noise level and ratio da/do (outer diameter of a vibration-absorbing plate/outer diameter of a tipped saw) as obtained in Test Example 6.

Cutting was performed at a rotational speed (of the tipped saw) of 4800 rpm and a material feed rate of 2 m/min. A workpiece of wood (spruce: conifer) was cut through longitudinal cutting, and noise generated due to the cutting was measured. The noise measurement was performed at a position which was separated, by 1 m, from the cutting point in the horizontal direction. FIG. 14 shows test results. In FIG. 14, da represents the outer diameter of the vibration-absorbing plate; and do represents the outer diameter of the tipped saw. As is apparent from FIG. 14, when the ratio da/do is not less than 0.8, the noise level decreased as compared to the tipped saw having no annular vibration-absorbing plate.

TABLE 7

| outer diameter of a vibration-absorbing plate (mm) | hole diameter of a vibration-absorbing plate (mm) | thickness (mm) |
|---|---|---|
| 220 | 180 | 0.25 |
| 200 | 150 | 0.25 |
| 180 | 130 | 0.25 |
| 150 | 110 | 0.25 |

(7) TEST EXAMPLE 7

Figure 16:
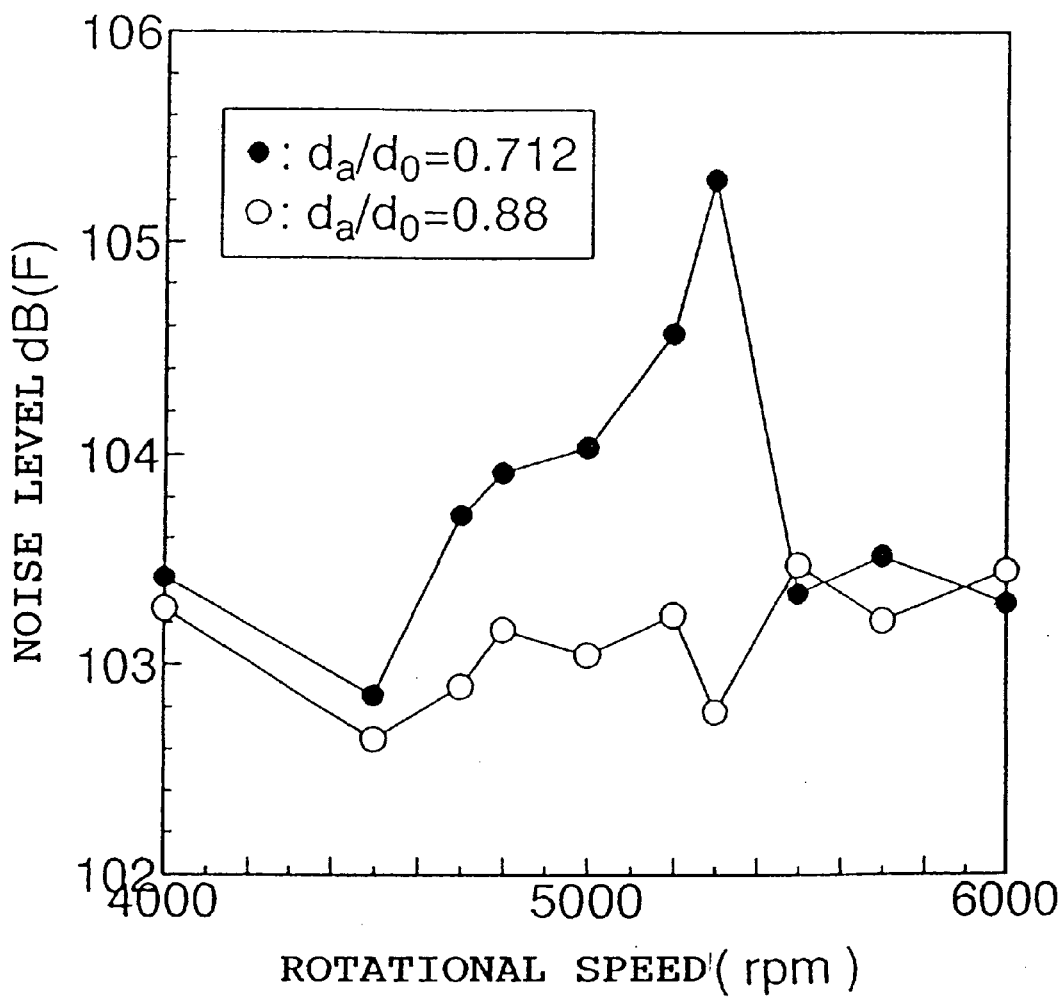
FIG. 16 shows a graph representing the relationship between noise level and rotational speed of a circular saw as obtained in Test Example 7.

A workpiece of wood (spruce: conifer) was subjected to longitudinal cutting which was performed at a tipped saw rotational speed of 4000 to 6000 rpm and a material feed rate 2 m/min by use of the same tipped saw as used in Test Example 6, and noise generated due to the cutting was measured. FIG. 16 shows test results. In FIG. 16, da represents the outer diameter of the vibration-absorbing plate; and do represents the outer diameter of the tipped saw. As is apparent from FIG. 16, when the ratio da/do was 0.88, the noise level could be reduced greatly as compared to the case of the ratio da/do being 0.712, within the rotational speed range of 4800 to 5300 rpm.

Figure 17A:
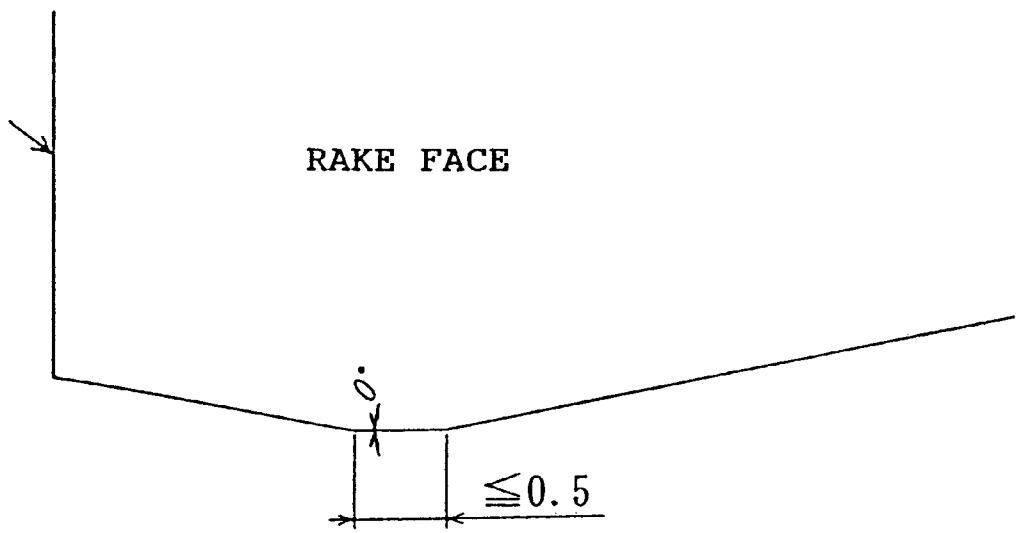
FIG. 17 shows an enlarged front view of a tip in which a inflexion portion of a side cutting edge has a deformed shape.
Figure 17B:
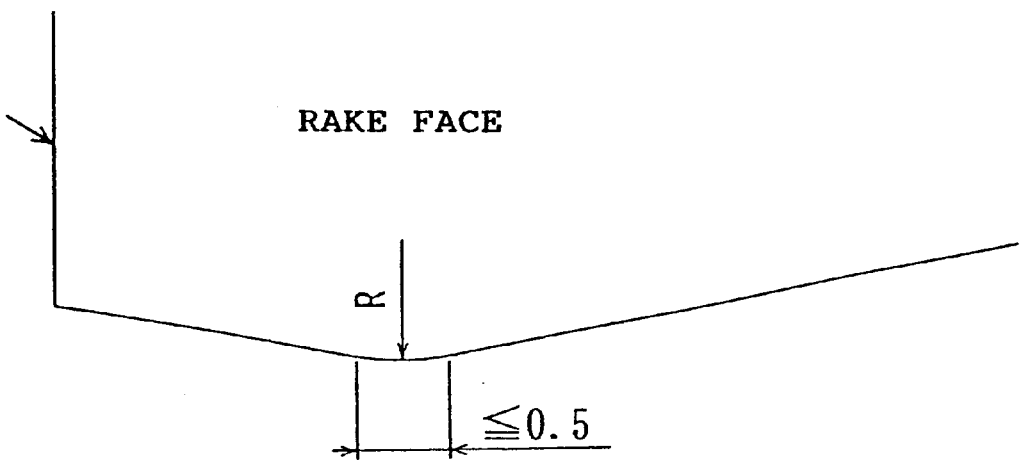
Figure 18:
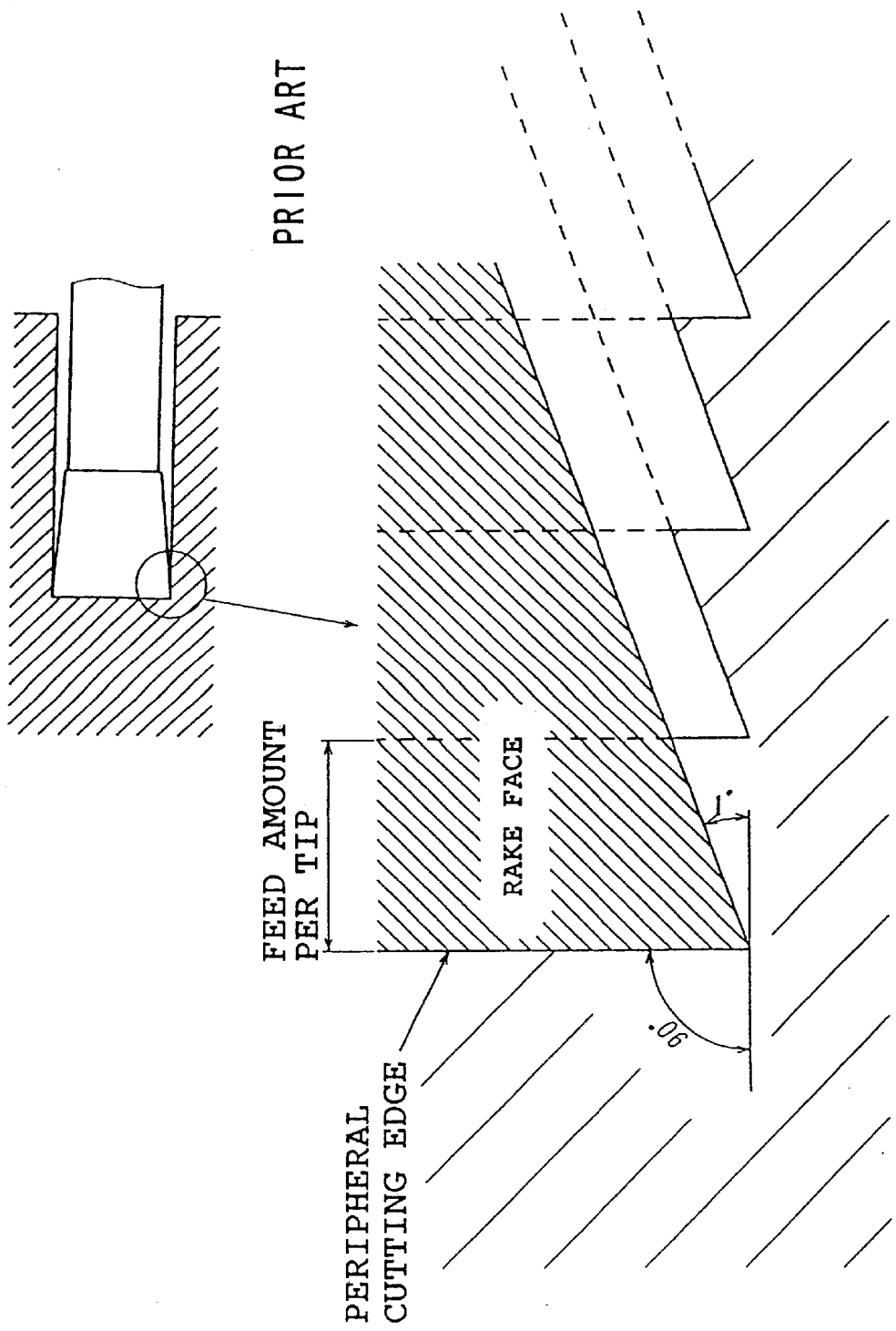
FIG. 18 is an explanatory diagram which is used for calculating the surface roughness of a material cut by use of a conventional circular saw.

In the above-described embodiments, each side cutting edge has an angular shape at the inflexion point K. This portion easily wears due to cutting, with the result that the radial clearance angle becomes zero or the portion assumes a rounded shape. Such wear is permissible if the length of the region in which the radial clearance angle is zero or the region of the rounded shape is not greater than the feed amount per tip (0.5 mm in this example), as shown in FIGS. 17($a$) and 17($b$).

In the tips according to the present invention, a relatively large load acts on the inflexion point during cutting operation, with resultant wear in the vicinity of the inflexion point. Therefore, a hard film or hardened layer is preferably formed on at least side surfaces of the tips, or the tips are preferably made of a hard material such as polycrystallin diamond.

INDUSTRIAL APPLICABILITY

The circular saw of the present invention is suitably used to cut a soft material such as wood to thereby reduce surface roughness and cutting resistance.

What is claimed is:

1. A circular saw comprising:

tips fixed to a plurality of teeth projecting radially outwardly from the outer circumference of a disk-shaped saw blade body, wherein a side cutting edge, which has an inflection point at a portion at which the side cutting edge projects laterally to the greatest distance in a front view of the tip, has a negative radial clearance angle of not less than −1° but less than 0° in the vicinity of the inflection point of the side cutting edge and on the outer circumferential side with respect to the inflection point, and a positive radial clearance angle greater than 0° but less than 1° in the vicinity of the inflection point of the side cutting edge and on the inner circumferential side with respect to the inflection point.

2. A circular saw comprising:

tips fixed to a plurality of teeth projecting radially outwardly from the outer circumference of a disk-shaped saw blade body, wherein a side cutting edge, which has an inflection point at a portion at which the side cutting edge projects laterally to the greatest distance in a front view of the tip, has a negative radial clearance angle of not less than −1° but less than 0° in the vicinity of the inflection point of the side cutting edge and on the outer circumferential side with respect to the inflection point, and a positive radial clearance angle greater than 0° but less than 1° in the vicinity of the inflection point of the side cutting edge and on the inner circumferential side with respect to the inflection point, and wherein a cutting edge blade chip is formed at least on the side surface with a hard film or a cured layer, or formed of polycrystalline diamond.

3. A circular saw comprising:

tips fixed to a plurality of teeth projecting radially outwardly from the outer circumference of a disk-shaped saw blade body, wherein a side cutting edge, which has an inflection point at a portion at which the side cutting edge projects laterally to the greatest distance in a front view of the tip, has a negative radial clearance angle of not less than −1° but less than 0° in the vicinity of the inflection point of the side cutting edge and on the outer circumferential side with respect to the inflection point, and a positive radial clearance angle greater than 0° but less than 1° in the vicinity of the inflection point of the side cutting edge and on the inner circumferential side with respect to the inflection point, and wherein a cutting edge blade chip has a face bevel angle or zero or a positive face bevel angle.

* * * * *